Jan. 29, 1929.                      1,700,216
A. A. DENSMORE
ENGINE STARTER
Filed Sept. 16, 1922
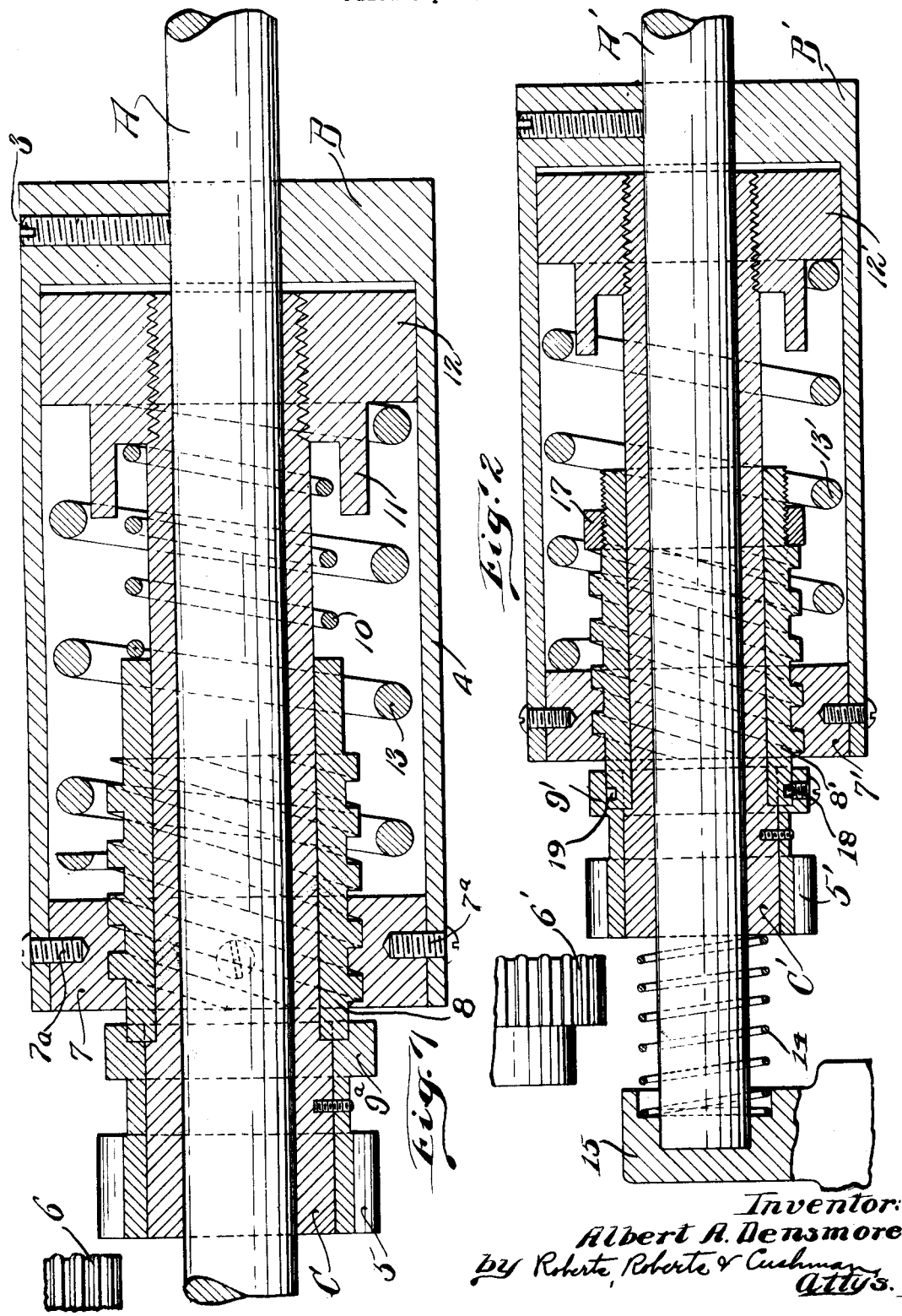
Inventor:
Albert A. Densmore
by Roberts, Roberts & Cushman
Attys.

Patented Jan. 29, 1929.

1,700,216

UNITED STATES PATENT OFFICE.

ALBERT A. DENSMORE, OF BROOKLINE, MASSACHUSETTS, ASSIGNOR TO ECLIPSE MACHINE COMPANY, OF ELMIRA HEIGHTS, NEW YORK, A CORPORATION OF NEW YORK.

ENGINE STARTER.

Application filed September 16, 1922. Serial No. 588,599.

This invention relates to improvements in power transmission mechanism and in particular to engine starting devices.

Objects of the invention are to provide a device of the character described which consists of few parts of strong and durable construction adapted to withstand the strains to which such mechanism is subjected, which will not be broken or otherwise damaged if the engine backfires, and in general to simplify and improve such devices and to render them efficient and satisfactory in service.

In its broader aspects, the invention comprises a driven element in telescoping relation with a driving element and connections between the elements whereby on rotation of the driving element the driven element is moved axially to clutch the two elements together so that they turn in unison. This clutching of the elements together is not of positive character, however, so that under unusual conditions and strains, as when the engine is reversely rotated due to backfiring, relative movement of the elements rather than breakage of parts is provided for.

In its more specific aspect the invention comprises an engine starting mechanism in which the driving and driven elements adapted to be clutched together are both mounted upon the drive shaft, the driving element being fast on the shaft and the driven element being movable both axially and rotatably upon the shaft, axial movement of the driven element being produced by interengaging threaded parts carried by the driving and driven elements respectively. Interposed between suitable abutments on the telescoping driving and driven elements is the clutching member, which may be in the form of a compression spring, whereby the torque of the driving element is transmitted to the driven element by frictional contact of the compressed spring with its abutments when it is compresed by the axial movement of the driven element. In its preferred form the threaded part on the driving element serves as one abutment for the clutching spring. The other threaded element is loose on the driven element and is normally held by suitable means against a stop thereon. In order to illustrate the invention, species of the genus comprising the invention are shown in the accompanying drawing, in which:

Fig. 1 is a sectional view of one form of transmission mechanism involving the features of the invention;

Fig. 2 is a similar view showing a modification.

The embodiment of the invention disclosed in Fig. 1 comprises a drive shaft A which may be the armature shaft of a starting motor for an internal-combustion engine or a shaft geared thereto. Fastened upon drive shaft A in any suitable manner, as by means of a set screw 3 is a driving member B in the form of a sleeve. A substantial part 4 of the driving member B is bored out to provide a sleeve or driving barrel surrounding driving shaft A and arranged in telescoping relation with a driven shaft or sleeve C freely slidable and rotatable upon drive shaft A. Fastened upon the outer end of driven shaft or sleeve C is a gear 5 adapted to be brought into mesh with a gear 6 mounted upon or connected to the main shaft of the internal combustion engine or other mechanism adapted to be set in motion by the transmission device. The connections between driving member B and driven member C are such that on initial rotation of shaft A, sleeve C is moved to the left to bring pinion 5 into mesh with gear 6, this active movement of member C serving to clutch members B and C together so that the driving impulse of shaft A is communicated to pinion 5 and thence to gear 6. Preferably the adjacent ends of the teeth of gears 5 and 6 are rounded as shown to facilitate the intermeshing of the teeth with each other as gear 5 is moved toward gear 6.

The connections between members B and C comprise complemental threaded parts 7 and 8, part 7 being in the form of a collar fitting within the outer end of the sleeve 4 and secured thereto by suitable means such as screws 7ª. Part 8 is in the form of a sleeve freely slidable and rotatable upon driven member C and with its outer end normally abutting a stop 9 upon member C. Stop 9 may be integral with pinion 5 as shown. Part 8 is preferably retained in engagement with stop member 9 by means of a light coil spring 10 interposed between the inner end 8 and an abutment member 11 screw-threaded upon or otherwise fast to the inner end of the driven member C. Beyond member 11 and preferably integral with the latter is a collar 12 substantially fitting the inner bore of the sleeve-like portion 4 of drive member B.

The clutching together of members B and C is effected by means of a heavy coil spring 13 interposed between suitable abutments consisting of threaded part 7 and collar 12 respectively. As indicated, spring 13 is normally out of engagement with one or both of its abutments 7 and 12 so that in the normal position of the parts no clutching effect whatever is produced.

In operation, when shaft A is rotated, the member C and the part 8 thereon do not rotate therewith due to their inertia, spring 10 helping to transmit the inertia of driven element C to part 8. In consequence of the threaded connection between parts 7 and 8, part 8 is moved to the left, pushing element C in that direction and causing pinion 5 to mesh with gear 6. Continued movement of element C to the left serves to compress clutching spring 13 between abutments 7 and 12 as the latter approaches the former. As the spring becomes compressed it gradually transfers the rotating movement of member B to member C and when sufficiently compressed the full driving force of shaft A is transmitted therethrough to gear 6. Thus a non-positive frictional clutching effect is produced so that under unusual strain such as when the engine backfires, reverse movement of member C relative to member B is possible without breakage of parts. As soon as the engine ceases to backfire the spring 13 will again renew the drive and transmit the proper rotating movement to gear 6. After the engine begins to run under its own power, the excess speed imparted to pinion C over that of drive shaft A causes member 8 to move axially relatively to member 7 thus drawing gear C out of mesh with gear 6 and restoring the parts to original position.

In the embodiment shown in Fig. 2, clutching spring 13' is normally in engagement with abutment 7', having threaded engagement with driving sleeve B' and with the abutment 12' on driven element C', so that whenever drive shaft A is rotated there is a tendency to transfer this rotating movement through spring 13' to driving element C'. A light coil spring 14 is interposed between the outer end of driving element C' and a bearing bracket 15 having a journal opening for the outer end of drive shaft A'. Spring 14 serves to resist or counteract the initial rotative effect produced by the clutching spring 13' so that axial movement of part 8' may be effected, irrespective of its inertia, to slide element C' until pinion 5' meshes with gear 6'. In this form of the device part 8' is connected to part 9' by means of a pin 18 secured in part 9' and projecting into a groove 19 in part 8', and a stop collar 17 is mounted on part 8' to prevent excess outward movement of the latter.

From the above it will be apparent that the mechanism of this invention is exceptionally compact and of very few parts, that these few parts may be made of a structure adapted to withstand the strains to which such mechanism is subjected and that the heavy compression spring forming an element of the non-positive clutch may be readily arranged to transmit sufficient driving impulse to start the ordinary engine under normal conditions and to become inoperative, through slipping of frictional contact of its end abutments, when subjected in unusual strains as in reverse rotation of the engine due to backfiring.

What I claim is:

1. A transmission mechanism for engine starters comprising a drive shaft, a barrel secured concentrically thereto and adapted to be driven thereby, a sleeve mounted loosely on the shaft for longitudinal sliding movement thereon for engagement with a member of the engine to be started, a second sleeve mounted on the first sleeve, said second sleeve and barrel having cooperating connecting means whereby when the barrel is rotated, such second sleeve will be advanced longitudinally, said second sleeve being constructed and arranged to move the first sleeve into engagement with the engine member.

2. A transmission mechanism for engine starters comprising a drive shaft, a barrel secured concentrically thereto and adapted to be driven thereby, a sleeve mounted loosely on the shaft for longitudinal sliding movement thereon for engagement with a member of the engine to be started, a second sleeve mounted on the first sleeve, said second sleeve and barrel having cooperating connecting means whereby when the barrel is rotated such second sleeve will be advanced longitudinally, said second sleeve being constructed and arranged to move the first sleeve into engagement with the engine member, and means for normally holding one end of said second sleeve in engagement with the first sleeve.

3. A transmission mechanism for engine starters comprising a drive shaft, a barrel secured concentrically thereto and adapted to be driven thereby, a sleeve mounted loosely on the shaft for longitudinal sliding movement thereon for engagement with a member of the engine to be started, a second sleeve mounted on the first sleeve, said second sleeve and barrel having cooperating connecting means whereby when the barrel is rotated, such second sleeve will be advanced longitudinally, said second sleeve being constructed and arranged to move the first sleeve into engagement with the engine member said first sleeve having a shoulder intermediate its length, and means for normally holding one end of said second sleeve against said shoulder.

4. A transmission mechanism for engine starters comprising a drive shaft, a barrel secured concentrically thereto and adapted to be driven thereby, a sleeve mounted loosely on the shaft for longitudinal sliding movement thereon for engagement with a member of the engine to be started, a second sleeve mounted on the first sleeve, said second sleeve and barrel having cooperating connecting means whereby when the barrel is rotated, such second sleeve will be advanced longitudinally, said second sleeve being constructed and arranged to move the first sleeve into engagement with the engine member and yielding means for normally holding one end of said second sleeve in engagement with the first sleeve.

5. A transmission mechanism for engine starters comprising a drive shaft, a barrel secured concentrically thereto and adapted to be driven thereby, a sleeve mounted loosely on the shaft for longitudinal sliding movement thereon for engagement with a member of the engine to be started, a collar secured within the barrel and having a screw threaded bore, a second sleeve threaded in said bore of the collar and mounted loosely for rotation upon said first sleeve and adapted to contact and move the latter when it is itself advanced longitudinally by screw thread action when the barrel is rotated.

6. A transmission mechanism for engine starters comprising a drive shaft, a barrel secured concentrically thereto and adapted to be driven thereby, a sleeve mounted loosely on the shaft for longitudinal sliding movement thereon for engagement with a member of the engine to be started, a collar secured within the barrel and having a screw threaded bore, a second sleeve threaded in said bore of the collar and mounted loosely for rotation upon said first sleeve and adapted to contact and move the latter when it is itself advanced longitudinally by screw thread action when the barrel is rotated, said first sleeve having an abutment within the barrel, and a compression spring interposed between said collar and the abutment.

7. A transmission mechanism for engine starters comprising a drive shaft, a barrel secured concentrically thereto and adapted to be driven thereby, a sleeve mounted loosely on the shaft for longitudinal sliding movement thereon for engagement with a member of the engine to be started, a collar secured within the barrel and having a screw threaded bore, a second sleeve threaded in said bore of the collar and mounted loosely for rotation upon said first sleeve and adapted to contact and move the latter when it is itself advanced longitudinally by screw thread action when the barrel is rotated, said first sleeve having an abutment fitting the interior of the barrel and slidable therein, and a compression spring interposed between said collar and the abutment.

8. A transmission mechanism for engine starters comprising a drive shaft, a barrel secured concentrically thereto and adapted to be driven thereby, a sleeve mounted loosely on the shaft for longitudinal sliding movement thereon for engagement with a member of the engine to be started, a collar secured within the barrel and having a screw threaded bore, a second sleeve threaded in said bore of the collar and mounted loosely for rotation upon said first sleeve and adapted to contact and move the latter when it is itself advanced longitudinally by screw thread action when the barrel is rotated, said first sleeve having an abutment within the barrel, a compression spring interposed between said collar and the abutment, and a second spring between said abutment and the inner end of the second sleeve for holding such second sleeve in engagement with the first sleeve.

9. A transmission mechanism for engine starting comprising a driving member and a driven member normally in telescoping arrangement and mounted for movement axially relatively one with respect to the other and for relative rotation, means for moving said driven member outwardly of said driving member on initial rotation of the latter the driving member having an abutment at its outer end and the driven member having an abutment at its inner end, and resilient means constructed and arranged to act on said abutments and to become effective on outward movement of said driven member to yieldingly clutch said members together.

10. A transmission mechanism for engine starting comprising a driving member and a driven member normally in telescoping arrangement and mounted for movement axially relatively one with respect to the other and for relative rotation, means for moving said driven member outwardly of said driving member on initial rotation of the latter the driving member having an abutment at its outer end and the driven member having an abutment at its inner end, and a spring arranged to be compressed between said abutments on the telescoping portions of said members to clutch said members together.

11. A transmission mechanism for engine starting comprising a shaft, a member fast thereon having a sleeve portion concentric with the shaft but spaced therefrom, a second sleeve freely rotatable and slidable on said shaft and normally in telescoping relation with said first sleeve but spaced therefrom, and cooperating means on said sleeves arranged to move the second sleeve outwardly on initial rotation of said shaft and thereafter to clutch said sleeves to rotate together.

12. A transmission mechanism for engine starting comprising a shaft, a sleeve fast thereon and concentric therewith but spaced therefrom, a second sleeve freely rotatable and slidable on said shaft and normally in telescoping relation with said first sleeve, but spaced therefrom, clutch means including a spring interposed between said sleeves and located in the concentric space between them, and cooperating means on said sleeves arranged to move said second sleeve on initial rotation of said shaft to cause said clutch means to operate.

13. A transmission mechanism for engine starting comprising a shaft, a sleeve fast at one end thereto and having at its other end a portion concentric therewith and forming an abutment, a second sleeve freely rotatable and slidable on said shaft and normally in telescoping relation with said first sleeve, said second sleeve having at one end an abutment, a spring compressed between said abutments on said sleeves for yieldingly clutching said sleeves together, and cooperative means on said sleeves arranged to move said second sleeve to cause said spring to operate as a clutch.

14. A transmission mechanism for engine starting comprising a shaft having telescoping members thereon, one of said members being fast on said shaft and the other freely slidable and rotatable thereon, and interengaging threaded parts operatively connected with the respective members for producing axial movement of the slidable member upon rotation of the shaft, one of said parts being loose on the slidable member and the other fast on said first-named member.

15. A transmission mechanism for engine starting comprising a shaft having telescoping members thereon, one of said members being fast on said shaft and the other freely slidable and rotatable thereon, and interengaging threaded parts carried by the respective members for providing axial movement of said slidable member on rotation of said shaft, one of said parts being loose on said slidable member and engaging an abutment thereon, means for retaining said part in engagement with said abutment, and the other part being fast on said first named member.

16. A transmission mechanism for engine starting comprising a shaft having telescoping members thereon, one of said members being fast on said shaft and the other freely slidable and rotatable thereon, and interengaging threaded parts carried by the respective members for producing axial movement of said slidable member on rotation of said shaft, one of said parts being loose on said slidable member and the other fast on said first-named member, and means responsive to the axial movement of said slidable member for yieldingly clutching said members to rotate together.

17. A transmission mechanism for engine starting comprising a shaft having telescoping members thereon, one of said members being fast on said shaft and the other freely slidable and rotatable thereon, and interengaging threaded parts carried by the respective members for providing axial movement of said slidable member on rotation of said shaft, one of said parts being loose on said slidable member and the other fast on said first-named member, and a spring arranged to be compressed by the axial movement of said slidable member to yieldingly clutch said members to rotate together, one of said parts serving as an abutment for said spring.

18. A transmission mechanism for engine starting comprising a central rotary driving shaft, a sleeve secured at its inner end thereto and having an interior annular portion at its outer end, a second sleeve slidable axially upon the driving shaft and carrying at its outer end a gear and at its inner end an abutment within the first sleeve, a third sleeve loosely mounted upon the second sleeve for actuating the latter and operatively connected with said annular portion whereby when the latter is rotated the second and third sleeves, and the gear are moved axially, and resilient means located between said annular portion and the abutment to resist longitudinal movement of the latter.

19. A transmission mechanism for engine starting comprising a central rotary driving shaft, a sleeve secured at its inner end thereto and having an interior annular portion at its outer end, a second sleeve slidable axially upon the driving shaft and carrying at its outer end a gear and at its inner end an abutment within the first sleeve, a third sleeve loosely mounted upon the second sleeve for actuating the latter and operatively connected with said annular portion whereby when the latter is rotated the second and third sleeves and the gear are moved axially, and a coiled spring surrounding the second and third sleeves and interposed between said annular portion and the abutment to resist longitudinal movement of the latter.

20. A transmission mechanism for engine starting comprising a central rotary driving shaft, a sleeve secured at its inner end thereto and having an interior annular portion at its outer end, a second sleeve slidable axially upon the driving shaft and carrying at its outer end a gear and at its inner end an abutment within the first sleeve, a third sleeve loosely mounted upon the second sleeve for actuating the latter and operatively connected with said annular portion whereby when the latter is rotated the second and third sleeves, and the gear are moved axially, said second sleeve having a stop adjacent said gear, means for holding the third sleeve against the stop with a yielding pressure, and resilient means located between said annular portion and the abutment to resist longitudinal movement of the latter.

21. A transmission mechanism for engine starting comprising a central rotary driving shaft, a sleeve secured at its inner end thereto and having an interior annular portion at its outer end, a second sleeve slidable axially upon the driving shaft and carrying at its outer end a gear and at its inner end an abutment within the first sleeve, a third sleeve loosely mounted upon the second sleeve for actuating the latter and operatively connected with said annular portion whereby when the latter is rotated the second and third sleeves and the gear are moved axially, said second sleeve having a stop adjacent said gear, a spring acting on the third sleeve for holding it against the stop with a yielding pressure, and resilient means located between said annular portion and the abutment to resist longitudinal movement of the latter.

22. A transmission mechanism for engine starting comprising a rotatable driving member having a fixed position longitudinally, and a rotatable driven member normally in telescoping arrangement and mounted for movement axially one with respect to the other, means actuated by the rotation of the driving member for moving the driven member outwardly therefrom, said members having opposed abutments, and resilient means arranged in the line of transmission of torque and acting on said abutments and tending to hold them separated, said resilient means transmitting driving torque in the starting operation.

23. A transmission mechanism for engine starting comprising a rotatable driving member in the form of a barrel having an interior abutment and having a fixed position longitudinally, a rotatable driven member mounted concentric of such barrel for movement axially thereof and normally in telescoping arrangement therein, said driven member having an abutment opposed to the first mentioned abutment, means actuated by the rotation of the driving member for moving the driven member outwardly therefrom axially, and a coiled spring contained within the barrel and interposed between the two abutments and in the line of transmission of torque to resist such axial movement of the driven member, said resilient means transmitting driving torque in the starting operation.

Signed by me at Boston, Massachusetts, this eleventh day of September, 1922.

ALBERT A. DENSMORE.